March 5, 1929.  K. MUHLEISEN  1,704,097
PIPE SUPPORTING MEANS
Filed May 7, 1924
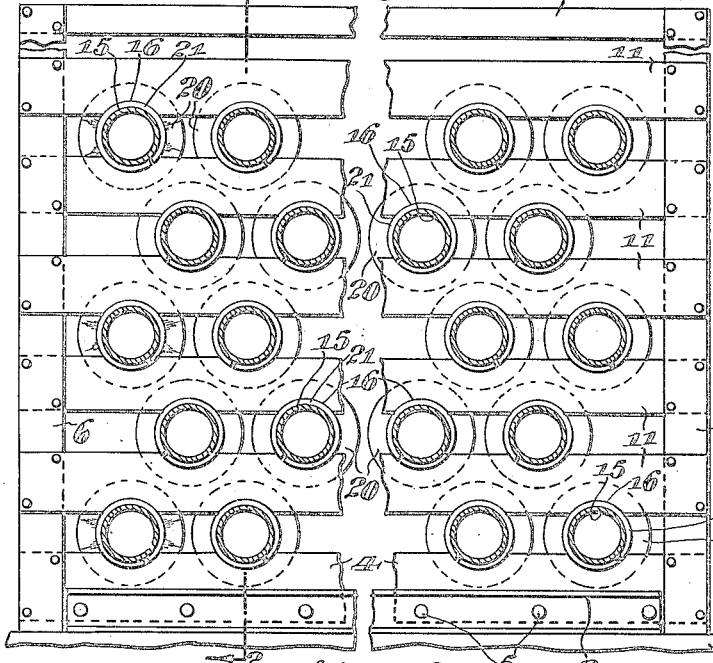
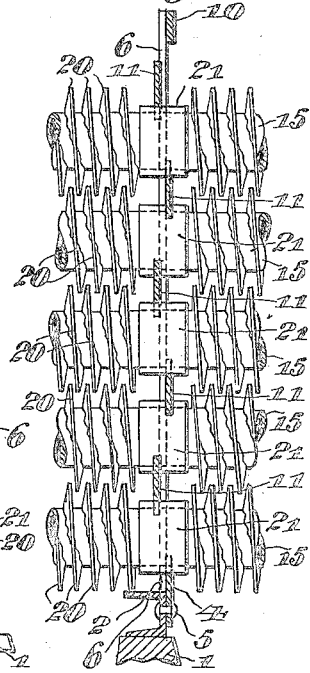
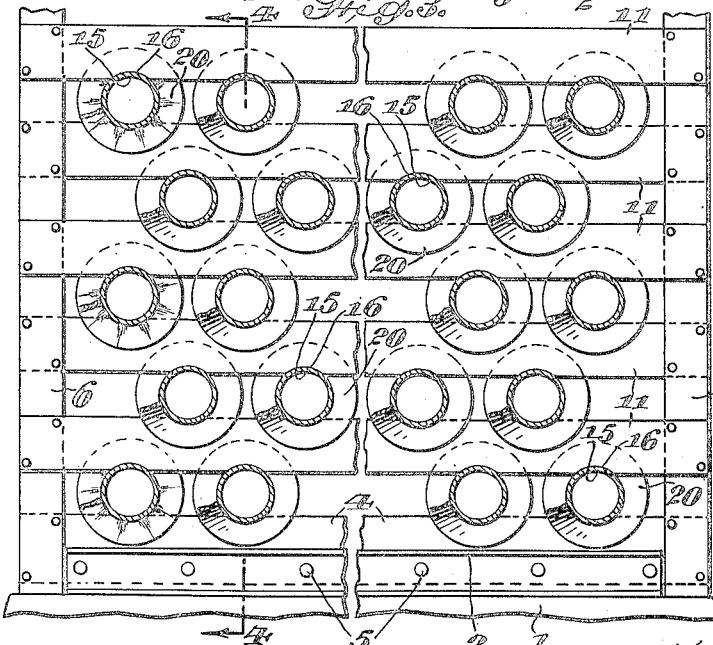
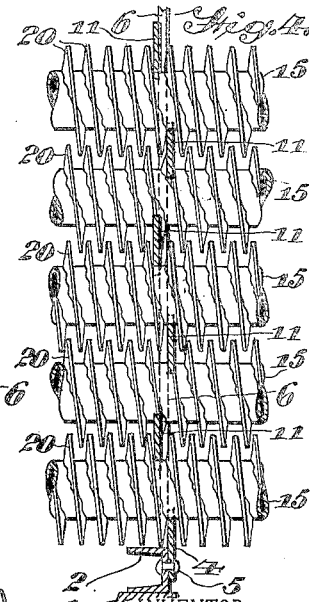
INVENTOR.
Karl Muhleisen
BY Cyrus N. Anderson
ATTORNEY.

Patented Mar. 5, 1929. 1,704,097

UNITED STATES PATENT OFFICE.

KARL MUHLEISEN, OF PHILADELPHIA, PENNSYLVANIA, ASSIGNOR TO SCHUTTE AND KOERTING COMPANY, OF PHILADELPHIA, PENNSYLVANIA, A CORPORATION OF PENNSYLVANIA.

PIPE-SUPPORTING MEANS.

Application filed May 7, 1924. Serial No. 711,704.

In the case of pipes and the like of considerable length, the opposite ends of which are attached to and supported upon headers or the like, it is desirable that they be supported at points intermediate their opposite end supports in such manner that any pipe may be removed without disturbing the other pipes.

The invention has specific relation to means for supporting pipes, intermediate their ends, which are provided with spiral ribs.

The general object of the invention is to provide means for supporting pipes having such ribs at one or more points intermediate their opposite end supports in such manner as to prevent sagging thereof and also in such manner as to permit the removal of any one pipe from a group or bundle of pipes without disturbing the other pipes in the group or bundle.

It is also an object of the invention to provide supporting means for intermediate portions of the pipes of a bundle or group of pipes which means is of such character that the pipes may be removed or inserted into position by rotating the same in proper directions having relation to the direction in which the spiral rib previously referred to may be coiled about the pipe.

Another object of the invention is to provide means whereby the supporting devices are not permitted to contact directly with the pipes themselves but with protecting means provided therefor.

To these and other ends the invention comprehends the construction as hereinafter described in detail, particularly pointed out in the claims, and as illustrated in the accompanying drawing forming a part of this specification and in which I have illustrated certain convenient mechanical forms of embodiment of the said invention.

In the drawing:

Fig. 1 is a transverse sectional view of a bundle of pipes showing the means for supporting intermediate portions thereof in side elevation;

Fig. 2 is a sectional view taken on the line 2—2 of Fig. 1;

Fig. 3 is a view similar to Fig. 1 but showing a slightly modified construction; and Fig. 4 is a sectional view taken on the line 4—4 of Fig. 3.

Referring to the drawing: 1 designates any suitable pedestal or support upon the upper edge of which a channel member 2 is secured and supported. It will be understood that any other suitably shaped member may be employed in lieu of the said channel member 2. A plate 4 is secured by means of rivets 5 to the channel member 2. The opposite ends of said plate extend beyond the opposite ends of the channel member 2. Upright posts or standards 6 are secured at their lower ends by means of rivets to the portions of the plate 4 which project beyond the opposite ends of the channel 2. The upper ends of these posts or standards 6 are connected together by means of a cross-bar 10.

Plates or bars 11 are secured at their opposite ends by means of rivets to the posts or standards 6. These plates are spaced from each other as shown. The amount of the spacing depends upon the size of the pipes 15 which are supported thereby. These plates are arranged alternately upon opposite sides of the posts 6, as is clearly indicated in the drawing. The opposing edges of adjoining plates are provided with arc-shaped notches 16, as shown. These notches are arranged in couples and the notches of each couple are in directly opposed relation to each other, as shown in the drawing.

In the construction as shown in Figs. 1 and 2 the spiral ribs 20 upon the pipes are interrupted, as shown, and in the spaces between adjacent end portions of said ribs formed by such interruptions sleeves 21 are mounted upon the said pipes 15. The bottom plate 11 is spaced from the plate 4 and the remaining plates 11 are spaced from each other distances such that the diameters of the circles which would be formed by extending the lines which outline the arcs of the arc-shaped notches 16 would be equal to the diameters of the sleeves 21 so that the latter fit snugly within the said notches, as is clearly indicated in the drawing.

The sleeves 21 upon the pipes constitute in effect bearings therefor which are mounted within the notches 16 previously referred to and prevent the pipes from contacting with the edges of such notches. This is desirable because the said pipes being employed in connection with machinery for conveying fluids in one direction or another and for one purpose or another are caused to vibrate, such vibration being due to the vibration of such machinery. If the pipes are supported in direct contact with the edges of the notches 16 they are liable in time to be worn through at the points where such contact is made. It is preferable, therefore, though not necessary, that the pipes be protected against the edges of the notches formed in the supporting plates 4 and 11 by means of sleeves 21 or other like or equivalent means.

As stated, the construction as shown in Figs. 1 and 2 of the drawing, in which sleeves 21 are employed as bearing means for supporting the pipes, is the preferred form of construction, but such sleeves may be omitted if desired, and in Figs. 3 and 4 a construction is shown in which the edges of the notches 16 contact directly with the pipes themselves. In the construction as shown in Figs. 3 and 4 the spiral ribs are continuous and the edges of the plates 4 and 11 extend in between adjacent portions of the ribs. This is practical in view of the fact that the plates 4 and 11 are placed alternately upon opposite sides of the posts or standards 6 previously referred to.

In either form of construction any one of the pipes may be removed by disconnecting the opposite ends thereof from the headers or other supports to which they may be connected and thereafter turning the pipes in a direction to remove the same, depending upon the direction in which the spirals of the coiled ribs 20 extend. To insert a pipe it would of course be rotated or turned in the opposite direction.

In the construction as shown in Figs. 1 and 2, in order to remove a pipe it would be necessary, after disconnecting the opposite ends thereof from the end supports, to pull such pipe in one direction or the other in order to bring the adjacent end of a coiled rib into contact with or in operative relation to the plates by which the same is held and supported. In both forms of construction the pitch of the spiral ribs corresponds to the offset relationship of adjoining supporting plates or bars between which the pipes are located.

It will be seen that by my invention means is provided whereby any pipe of a group or bundle of pipes may be removed without disturbing the other pipes.

Although in the construction as illustrated only one supporting means is shown, it will be understood that such supporting means may be repeated or employed at intervals if the pipes are of a length to render necessary the employment of supporting means at intervals.

Having thus described my invention, what I claim and desire to secure by Letters Patent is:

1. In means for supporting pipes intermediate their ends for preventing sagging thereof, the combination of posts arranged in spaced relation to each other, cross-plates secured at their opposite ends to said posts in spaced relation to each other, adjoining cross-plates being located in offset relation to each other, and a pipe extending between the edges of adjoining cross-plates, the said pipe being supported and held in position by the said plates, and the said pipe being provided with a spiral rib.

2. In means for supporting pipes intermediate their ends, the combination of posts arranged in spaced relation to each other, cross-bars secured at their opposite ends to said posts and supported in spaced relation to each other thereon, adjoining cross-bars being located in offset relation to each other, the opposing edges of adjoining cross-bars having notches therein, which notches are arranged in opposed relation to each other, and a pipe mounted within said notches, which pipe is provided with a spiral rib.

3. In means for supporting pipes intermediate their ends, the combination of posts arranged in spaced relation to each other, cross-wise extending plates having connection at their opposite ends to said posts and supported thereby in spaced relation to each other, the opposing edges of adjoining plates being provided with notches therein in opposed relation to each other, adjoining plates being located in offset relation to each other, and a pipe extending between the opposing edges of adjoining plates and being partially supported thereby in order to prevent sagging thereof, and the said pipe being provided with a rib spirally coiled around the same, which rib is provided with an interruption, and a bearing sleeve upon the said pipe in the space formed by the said interruption, which sleeve is situated within and contacts with the edges of the said notches.

4. In means for supporting pipes, said pipes being provided with ribs spirally coiled around the same, the combination of posts arranged in spaced relation to each other, crosswise extending bars having connection at their opposite ends to said posts and supported thereby, adjoining bars being offset with relation to each other to accommodate the pitch of the spiral coil on one of said pipes, and the said adjoining bars being provided with notches, the said pipe passing between said bars and being supported thereby in and between said notches.

In testimony that I claim the foregoing as my invention I have hereunto signed my name this 1st day of May, A. D. 1924.

KARL MUHLEISEN.